(12) United States Patent
Morimoto

(10) Patent No.: US 6,535,188 B1
(45) Date of Patent: Mar. 18, 2003

(54) LIQUID CRYSTAL DISPLAY DEVICE

(75) Inventor: Hirokazu Morimoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/349,245

(22) Filed: Jul. 8, 1999

(30) Foreign Application Priority Data

Jul. 8, 1998 (JP) ............................................ 10-193303

(51) Int. Cl.⁷ ................................................ G09G 3/36
(52) U.S. Cl. ........................ 345/87; 349/106; 349/156
(58) Field of Search ................................ 349/155, 156, 349/106; 427/164

(56) References Cited

U.S. PATENT DOCUMENTS 5,627,665 A * 5/1997 Yamada et al. ............. 349/156
5,922,401 A * 7/1999 Kashiwazaki et al. ...... 427/164
6,067,144 A * 5/2000 Murouchi ................... 349/156

OTHER PUBLICATIONS

Bahadur, Liquid Crystals Applications and Uses, 1990, World Scientific, vol. 1, p. 179.*

* cited by examiner

*Primary Examiner*—Kenneth Parker
*Assistant Examiner*—David Y Chung
(74) *Attorney, Agent, or Firm*—Pillsbury Winthrop LLP

(57) ABSTRACT

It is aimed to provide such a liquid crystal display device capable of reducing a fluctuation in thickness of liquid crystal layer and thereby capable of preventing deterioration of a displayed image such as a local deviation of a contrast ratio, in particular, in such a display device where light of display is controlled on the basis of the birefringence effect of a liquid crystal material. On a transparent insulator substrate, a single and smooth dye-accepting layer is formed by coating of resin and its patterning. On the layer, a large number of pillar-shaped spacer projections having an equal projecting dimension are uniformly distributed. Colored patterns constituting a color filter are formed on beforehand by tinting the dye-accepting layer with dyes of red, green and blue to respective predetermined region.

11 Claims, 5 Drawing Sheets

LIQUID CRYSTAL DISPLAY DEVICE

BACKGROUND OF THE INVENTION

1. Field of the Invention

The present invention is related to a liquid crystal display device in which light emission from viewer's side (display side) of a liquid crystal layer is turned ON/OFF or controlled to be increased/decreased on the basis of a birefringence (double refraction) effect of the liquid crystal material.

2. Description of the Related Art

Liquid crystal display devices have excellent features such as thin and light weight, low power consumption and mild fatigue in eyes. For this reason, the liquid crystal display devices have come to be used in various fields such as displays for notebook-size personal computers and for portable wordprocessor-dedicated machines, and is expanding their fields of use and markets more and more.

In recent years, not only the market of medium/small screen-sized liquid crystal display devices expands continuously, but also the market of large screen-sized (larger than, or equal to 13 inches) liquid crystal display devices expands rapidly. As for the large screen sized liquid crystal display devices, reduction of viewing-angle-dependency in a color tone and contrast is a requirement to meet. Particularly for large screen-sized computer displays for CAD system and the like, and for displays for conference or interview purposes, reduction of the viewing-angle-dependency is an important requirement.

As one of the methods for reducing the viewing-angle-dependency, liquid crystal display devices utilizing the birefringence effect of liquid crystal materials, in particular, IPS (In-Plane Switching) type liquid crystal display devices are researched and developed eagerly.

Referring now to a schematic diagram of FIG. 5, a basic displaying mechanism in an IPS type liquid crystal display device will be explained. In following, an IPS type liquid crystal display device operated in a normally black mode is exemplified.

Liquid crystal molecules are oriented to be substantially horizontally with respect to a plane of the substrate, and to be in substantially parallel to each other. A polarizing plate 15 is arranged on an outer surface of an array substrate 2 (namely, on lower surface of lower board in FIG. 5), while another polarizing plate 28 is arranged on an outer surface of a counter substrate (namely, on upper surface of upper board in FIG. 5) which is provided on a screen side or viewer's side. The arrangement is made in such a manner that polarizing directions of these polarizing plates 15 and 28 are intersected substantially perpendicular to each other.

At an initial stage (non-voltage-applied state), as represented in a left half portion of FIG. 5, the liquid crystal molecules are arranged to be substantially parallel to the polarizing direction of the lower polarizing plate 28. As a result, light from a light source at underneath is not transmitted to viewer's side, that is upper side in the figure.

On the other hand, as shown in a right half portion of FIG. 5, in a domain of each of pixels (minimum display unit) on the array substrate 2, when a voltage is applied between a pixel electrode 21 and a counter electrode 22, on orientation (director direction) 5 of liquid crystal molecules are controlled to be aligned along lines of electric force, so that the light is transmitted on basis of the birefringence effect.

Ordinarily, to perform a color representation, colored patterns constituted by fine patches of red (R), blue (B), and green (G), which are three primary colors of light, are formed on the counter substrate 1. This colored pattern called as a color filter is formed in such a manner that colored films of the three primary colors are allocated every three pixels located adjacent to each other. Then, relative ratios of light intensities as to these three pixels located adjacent to each other are adjusted, so that color tone representation can be realised. There are frequent occasions when a set of 3 minimum display units, i.e., R, G, D is counted as a 1 pixel in color display devices. However, in this specification, a minimum display unit is referring to as a "pixel".

The color patterns of three primary colors are formed in the following manner. A coating material in which any one of primary color pigments has been dispersed is coated on a whole surface of the substrate by way of either a spin coater or a curtain coater. Subsequently, a patterning process in use of photolithography technique is carried out so as to form colored films only over pixels that are allocated to this selected color of the three primary colors. A similar patterning process is carried out with respect to other primary colors. In this way, colored patterns of the three primary colors are obtained by 3 times of the coating and patterning processes.

On the other hand, in order to make a uniform thickness of liquid crystal layer, spherical resin bodies having uniform diameters are dispersed on any one of the substrate boards before the array substrate is attached to the counter substrate. This spherical resin body is called as a "spacer".

However, these spherical spacers are partially aggregated, in the worst case, a bright-point defect is produced on the screen of the liquid crystal display device. Further, when fluctuation and deviation in dispersing density give rise a region of substantially no spherical spacer, the thickness of the liquid crystal layer in this region becomes thinner than that of another region. Thus, the resulting contrast ratio on the display screen would become unequal, to deteriorate the picture representation on the screen. Additionally, since the spherical spacers are distributed also to the display areas within the pixels, light leakage will occur by these spherical spacers themselves, and by the orientation failures of the liquid crystal molecules at around the spherical spacers. Such light leakage deteriorate the contrast ratio.

Usually, each of these colored films of three primary colors, which constitute colored patterns, is formed separately in respective process step. As a result, it is difficult to achieve sufficiently uniform thickness. In most cases, a stepped portion is produced between a color-film region of a certain primary color and an adjacent color-film region of another primary color. That is, a height difference in respect of a surface of the substrate is produced between these regions.

More specifically, in order that a color representation characteristic of a liquid crystal display device may be improved so as to substantially represent a natural color, a thickness of a colored film used to form a colored pattern must be made thick, so that color density of the colored pattern is increased. However, when the thicknesses of the respective colored films of the three primary colors are increased as a whole, the differences in the thicknesses among the regions of the colored films are also increased. Usually, a thickness of a colored film is required to be about 1 μm. In this case, fluctuations in thickness is up to about 0.2 μm.

In the case that a thickness of a colored film is made thicker than 1 μm, fluctuations in thickness would be further increased. This is because in such a coating apparatus as a spin coater and a curtain coater, a coating materials for colored film having a high content of pigment and having a high viscosity cannot be sufficiently uniformly distributed on a substrate board.

The larger, the size of the substrate board on which the colored patterns are formed is, the bigger the fluctuation in the thickness of such colored films becomes.

Deterioration of the display performance due to uneven thickness of the liquid crystal layer is especially intense in the liquid crystal display devices which utilizes the birefringence effect of the liquid material as a display mode. As mentioned previously, the thicknesses of the liquid crystal layer has been made uneven because of the fluctuation and deviation in the distribution of the spherical spacers and because of the fluctuation in the thickness of the colored films.

SUMMARY OF THE INVENTION

The present invention has been made in view of the above-mentioned problems, and is to provide a liquid crystal display device in which light ray through the liquid crystal layer is controlled on the basis of the birefringence effect of a liquid crystal material, capable of reducing a thickness fluctuation of liquid crystal layer and therefore, capable of avoiding an occurrence of a portion of a display image deterioration such as a deviation of contrast ratios.

A liquid crystal display device, according to the first aspect of the present invention, is featured by such a liquid crystal display device comprising: a first substrate having a color filter layer on a first insulator substrate; a second substrate opposing to said first substrate; a spacer projection integrally formed on at least one of said first substrate and said second substrate and keeping a predetermined gap between the substrates; a liquid crystal layer held in said gap; and a plurality of pixel regions performing a display operation based on the birefringence effect of said liquid crystal layer; wherein: the color filter layer is a resin layer which is formed on said first insulator substrate and is tinted with requested colors corresponding to said pixel regions.

With employment of such a structure, there arises no deterioration in the display performance associated with uneven distribution and agglomeration of spherical spacers. Further, the deterioration associated with uneven thickness of the liquid crystal layer is largely reduced.

A liquid crystal display device, according to the second aspect, is featured by that the resin layer is a layer formed of a dye-accepting material onto which each dye has been discharged and accepted in correspondence with respective ones of said pixel regions.

With employment of the above-explained structure, an integrated color filter layer can be easily formed in low cost.

A liquid crystal display device, according to the third aspect, is featured by that the first board contains a light shielding film arranged at a peripheral portion of the pixel region; and the spacer projection is provided within a region corresponding to the light shielding film.

With employment of such a structure, it is possible to avoid lowering of the contrast ratio and lowering of the aperture ratio, which are caused by the light leakage due to the spacer material itself, and by failed-orientation of the liquid crystal at around the spacers.

A liquid crystal display device, according to the fourth aspect, is featured by that the spacer projection is directly provided on a layer of the dye-accepting material.

With employment of such a structure, since the spacer projections are formed on a plane having a little undulation, distance between the boards can be controlled in a more uniform manner.

A liquid crystal display device, according to the sixth aspect, is featured by that the spacer projection is formed of transparent light-curing resin.

With employment of such a structure, it is possible to readily form the spacer projections having an equal dimension in projecting-wise direction.

DESCRIPTION OF THE PREFERRED EMBODIMENTS

An IPS type liquid crystal display device, according to an embodiment of the present invention, will now be described with reference to FIG. 1 through FIG. 4.

Figure 1:
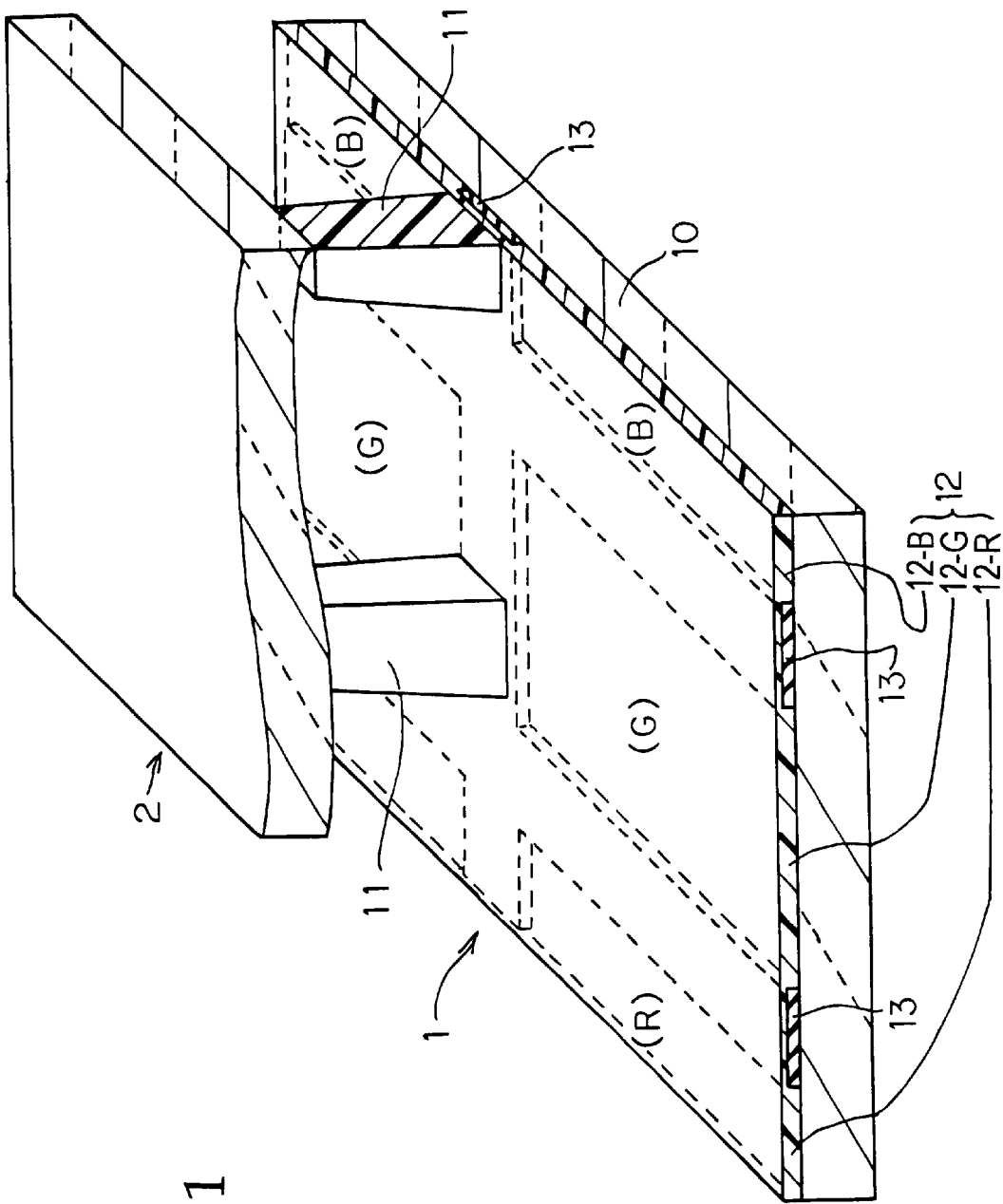
FIG. 1 schematically shows a partially-cut perspective view for explaining an essential portion of liquid crystal display device of an embodiment.

FIG. 1 schematically shows a partially-cut perspective view for describing an essential portion of the liquid crystal display device of the embodiment.

A counter substrate 1 shown in a lower part of this drawing is constituted by such that a grid-pattern-shaped black matrix 13, a single dye-accepting layer 12 for covering a substantially entire surface of the substrate, and a plurality of pillar-shaped spacer projections 11 are formed on a transparent insulator substrate 10 in this order.

As for an upper surface of the dye-accepting layer 12, ups and downs and a height difference in respect of the transparent insulator substrate 10 are notably small. Moreover, there is an extremely small fluctuation in projecting-wise dimension of the spacer projections 11 that are formed on the dye-accepting layer 12. Consequently, a fluctuation of a distance or gap between the counter substrate 1 and the array substrate 2, called as a "cell gap", within the liquid crystal display device is very small.

Subsequently, a step for manufacturing this counter substrate 1 will now be described with reference to FIG. 2 to FIG. 3.

Figure 2:
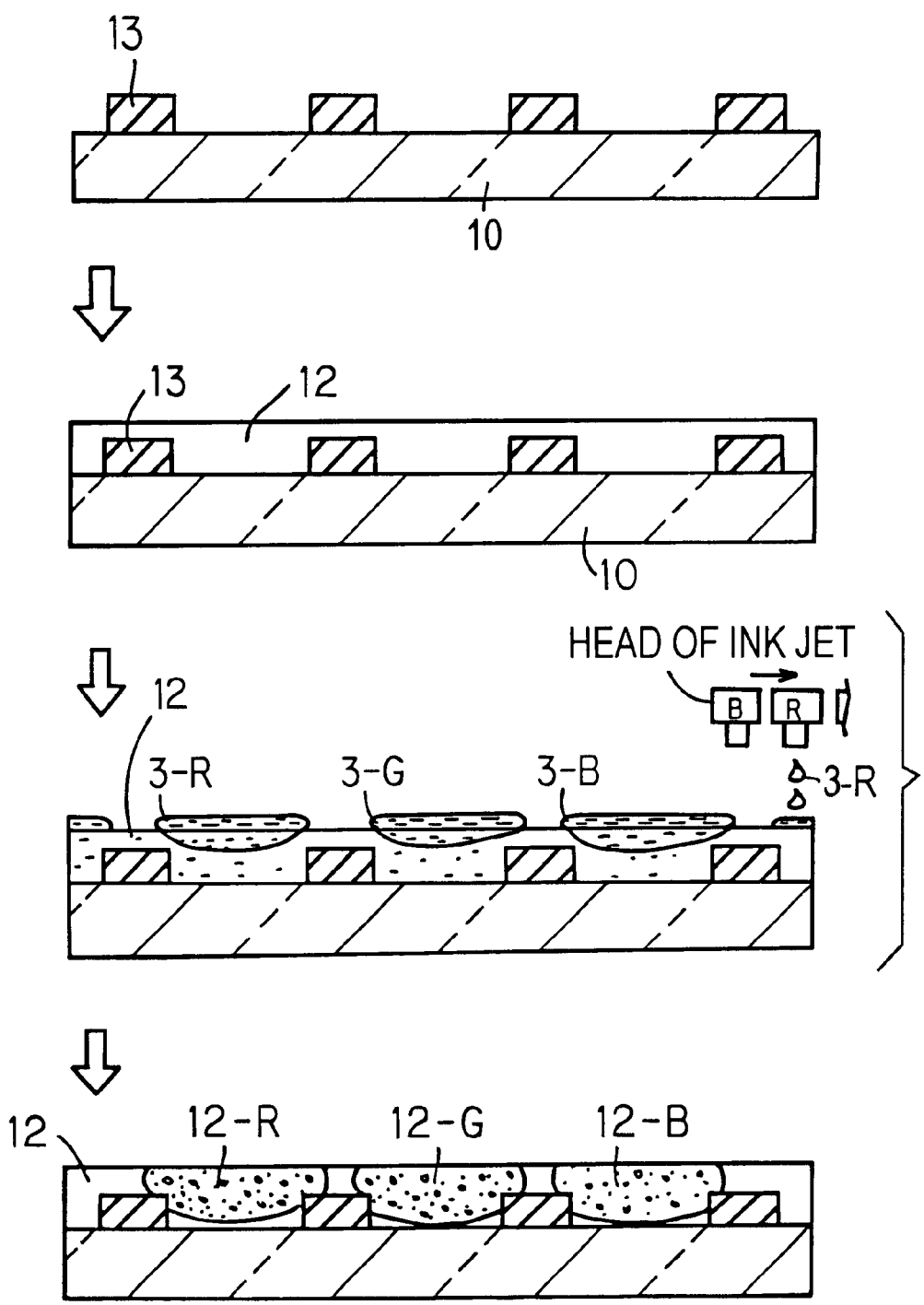
FIG. 2 is a step diagram for schematically representing a step for forming colored patterns of three primary colors, according to an embodiment.

In FIG. 2, there is schematically shown a method for forming the dye-accepting layer 12 equipped with colored patterns of three primary colors.

1. Forming of Black Matrix Resin Layer

A resin containing black pigment such as carbon is coated on a substantially whole surface of the transparent insulator substrate 10 for the counter substrate 1. Then, the resin is subjected to a photolithography technique to form a predetermined pattern of rectangular lattices or grids. This resin layer which constitutes the black matrix 13 is formed in thickness of about 1 μm. The reason why the black matrix 13 is not formed of a metal, but formed of a resin layer, is to eliminate an adverse influence on a horizontal electric field in the IPS type liquid crystal display device. Since the black matrix 13 is formed of the resin layer, the thickness of this black matrix 13 is preferably set to be equal to more than about 1 μm, which is larger than that of a black matrix formed of a metal layer.

2. Coating of Dye-Accepting Layer

Curable resin to form the dye-accepting layer 12 is coated on the substrate by use of a spin coater. Because the curable resin includes no pigment and has sufficiently low viscosity, coating in a uniform thickness over the whole surface of the substrate is achievable by use of a spin coater or the like. Consequently, the surface of the coated resin is extremely smooth with essentially no ups and downs or undulation.

3. Painting by Ink Jet (R, G, B Simultaneous Painting)

By use of the ink jet painting technique, patterns of dye are painted on the dye-accepting layer 12 before sufficient curing of the resin. The dye having a preselected color is discharged to each of regions for forming a red (R) colored pattern, a green (G) colored pattern, and a blue (B) colored pattern. Because of employing the ink jet painting technique, the three color dye 3-R, 3-B, and 3 C can be simultaneously applied onto the respective preselected regions, while the patterning step is no longer required.

As an apparatus for the ink jet technique, for instance, a bubble jet type apparatus may be employed.

In order for preventing undesirable mixing of the colors, it is effective to conduct a sufficient curing of the resin at only on the black matrix 13 or the like, before the discharge of dye in above way, so that the resin on the black matrix 13 do not accept the dye.

4. Fixing of Dye and Curing of Dye-Accepting Layer

In the case that the accepting layer is formed of thermosetting resin, a predetermined heating is carried out so as to promote curing of the dye-accepting layer 12, and so as to fix discharged dye 3-R, 3-B and 3-G in the dye-accepting layer, at the same time. It should be noted that this accepting layer may be formed of light-curing resin or the like. In the case of light-curing resin, the fixing of the dye is carried out by light irradiation.

Thereafter, the dye-accepting layer 12 is sufficiently heated, so that curing of the dye-accepting layer 12 is completed. The thickness of the resulting dye-accepting layer 12 was about 1.5 μm.

Because a flat dye accepting layer 12 is tinted, obtained surfaces of the layer has little unevenness. The surface roughness of the colored region can be reduced to a level of about 1/10 or less of the surface roughness in a case where each of the R, G and D colored regions is formed by patterning the coated layer containing the pigment.

Figure 3:
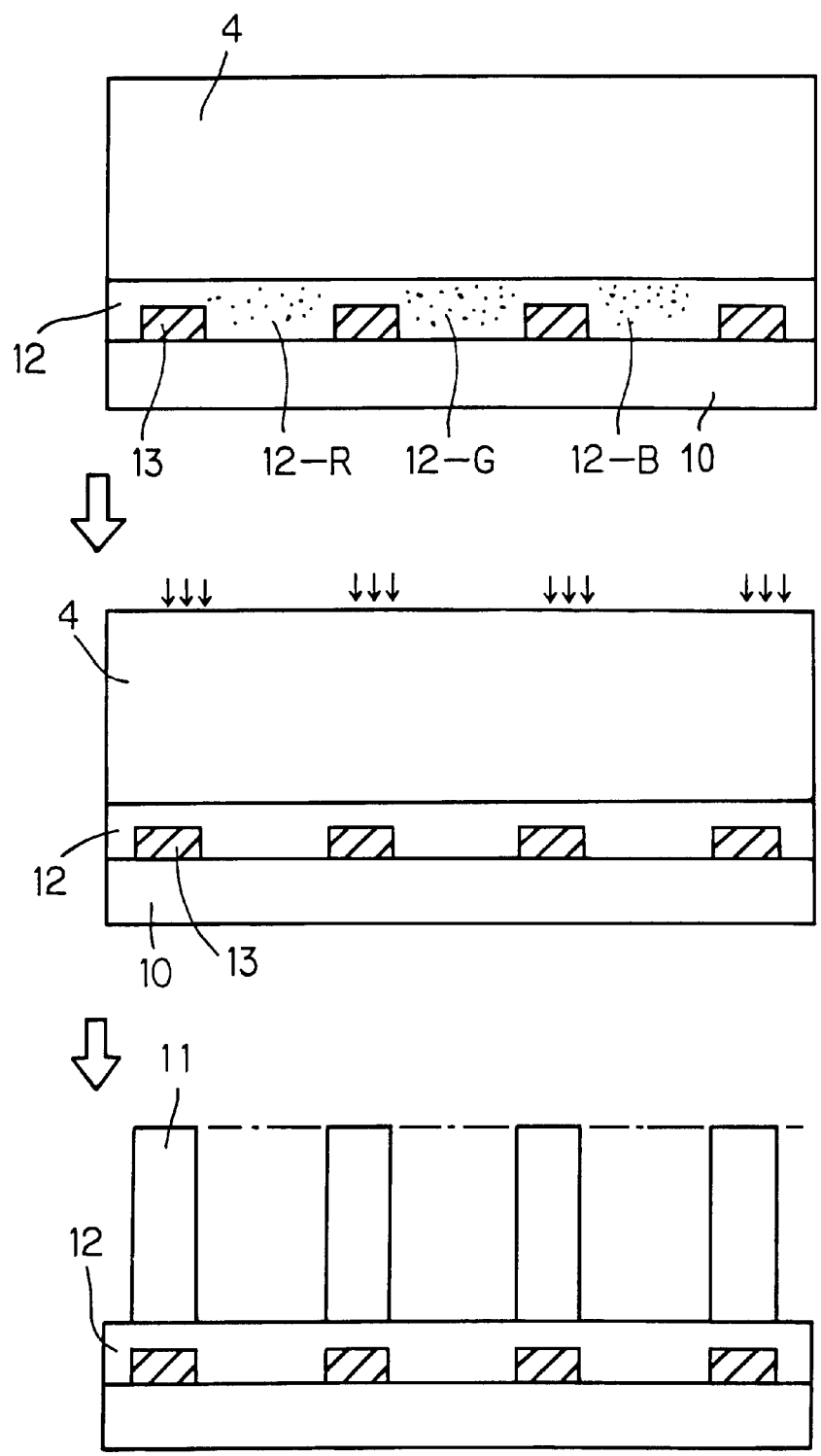
FIG. 3 is a step diagram for schematically showing a step for forming a pillar-shaped spacer projection, according to an embodiment.

FIG. 3 schematically represents a step for forming a pillar-shaped spacer projection 11.

1. Coating With Light-Curing Resin

Subsequent to the above-explained steps of FIG. 2, a light-curing resin 4 is applied by use of a spin coater to form a layer of a uniform thickness of about 5 μm. By employing a light-curing resin 4 of sufficiently low viscosity, extremely uniform coating is achievable.

2. Exposure Using Mask Pattern

By use of a mask pattern, only specified spots for forming the spacer projection 11 are exposed to Ultraviolet light irradiation to effect curing of the resin only at the spots. Sufficiently selective curing is achievable even when the layer of the resin has a considerably large thickness, by employing a light-curing resin having a high transparency and having an optimum sensitizer or the like in an optimum compound ratio.

It should be noted that the spacer projection 11 is provided within the region where the black matrix 13 is arranged, or within such a region that the light is shielded by a wiring line such as the below-mentioned storage-capacitance forming electrode of the array substrate, in order to avoid deteriorations of both the contrast ratio and the aperture ratio, which deteriorations are attributed to the spacer projection 11 itself.

3. Removing of Uncured Resin

By use of proper solvents or etching agents, uncured part of the light hardening resin 4 is removed in an area other than the spots irradiated with ultraviolet light. Then, a cleaning is conducted.

Because perfection is not achievable in respect of a selectivity in light irradiation as well as removal of the uncured resin, the circumferential face of the resultant pillar-shaped spacer projection 11 taper towards a tip of the projection. However, such slight tapering causes no problem. Sufficient suppression of the tapering is achievable by optimizing the above-mentioned composition of the resin, conditions for the exposure and conditions for removal process.

As previously explained, in the step for forming the spacer projection 11 according to the embodiment, it is achievable to control the projecting dimension of the spacer projection to be extremely uniform. As a result, as previously explained with reference to FIG. 2, if the spacer projections 11 are provided on the flat dye-accepting layer 12 having no height difference, the tip faces of the spacer projections 11 are in an equal height.

As will be described with reference to FIG. 4, the array substrate 2 of the liquid crystal display device according to the embodiment has one of common structures employed in array substrates for an IPS type liquid crystal display device.

Figure 4:
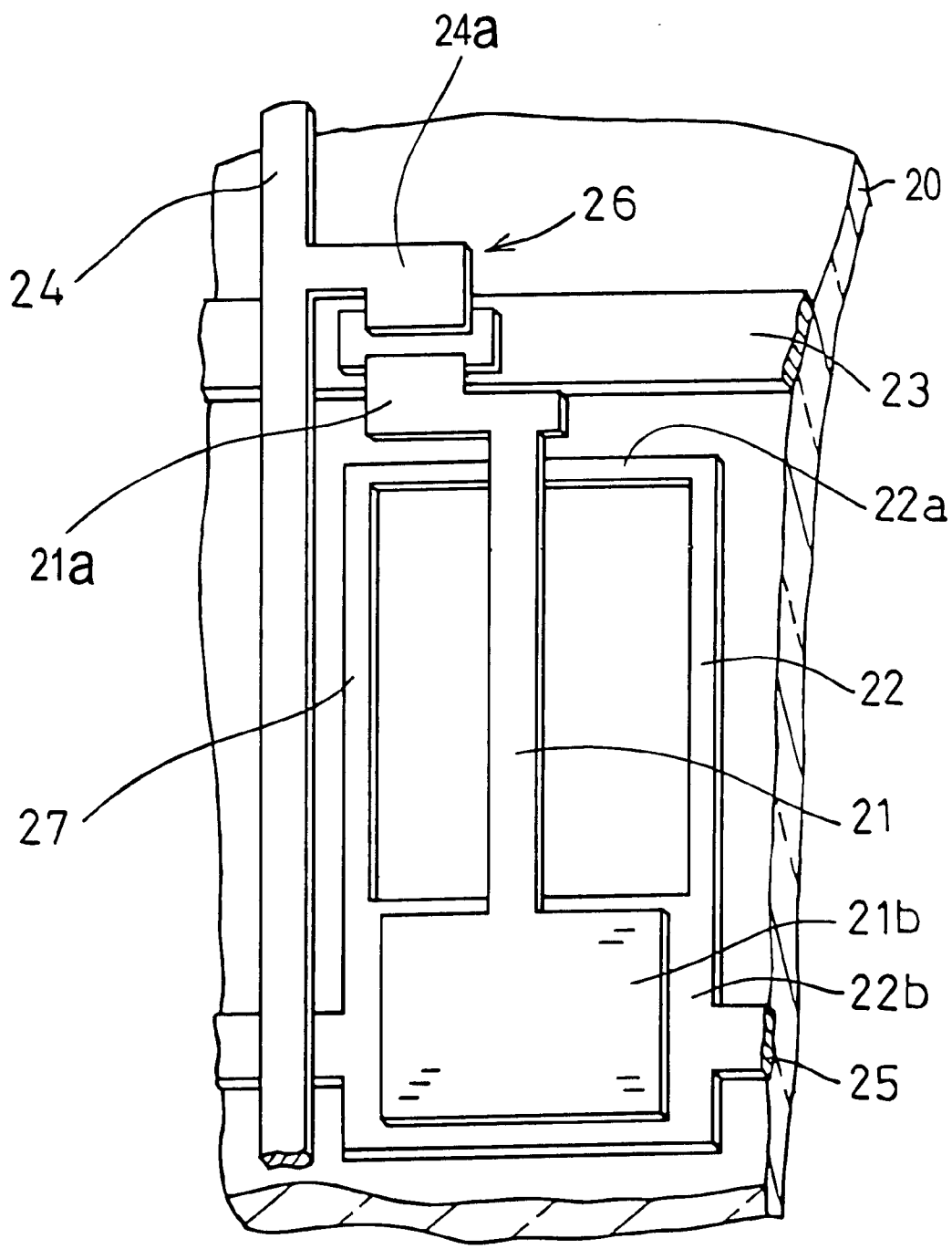
FIG. 4 is a plan perspective view for schematically indicating a basic structure of each pixel of an array substrate employed in an IPS type liquid crystal display device.
Figure 5:
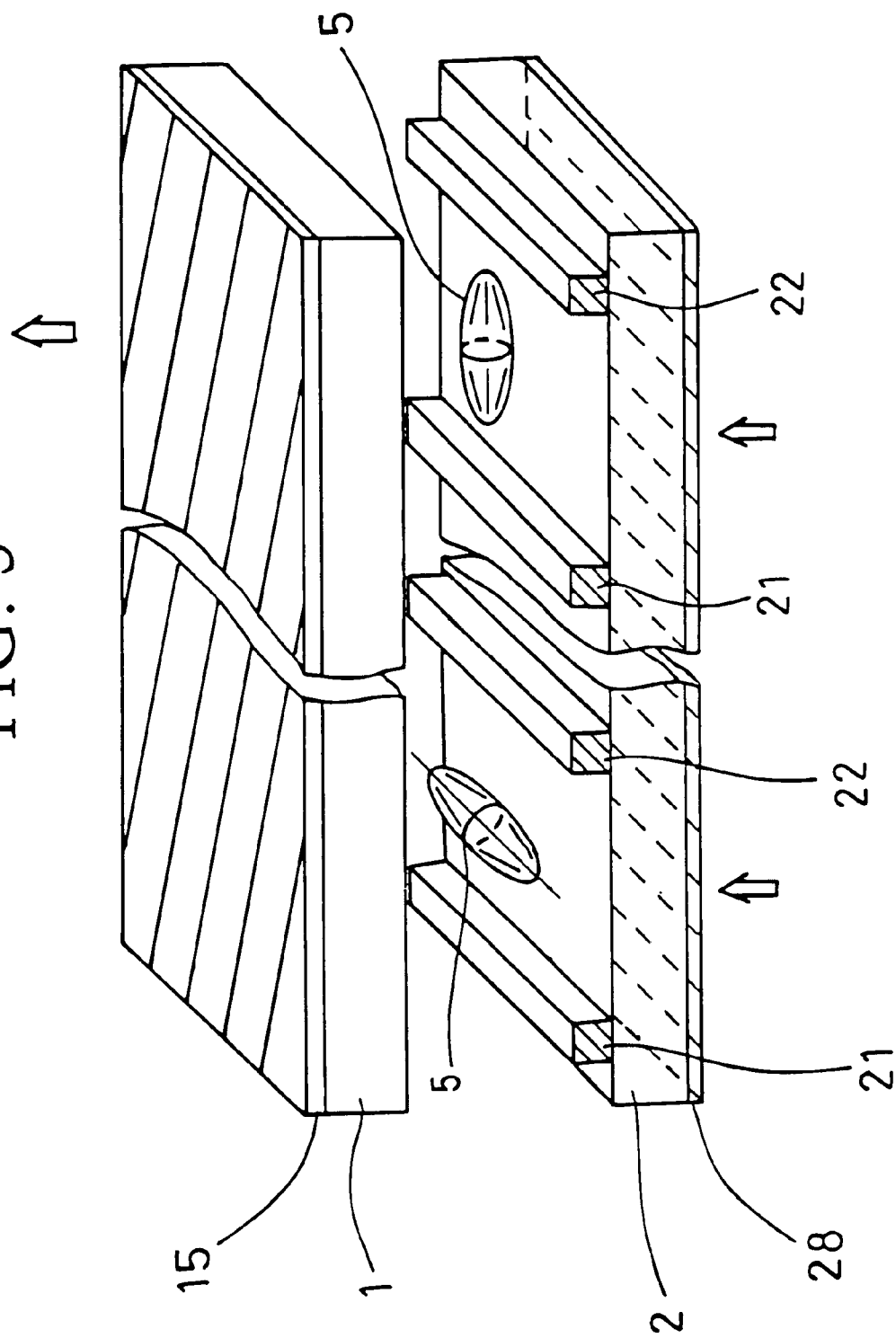
FIG. 5 is a perspective view of a conceptional sectional drawing used to explain the basic mechanism of displaying operation in the IPS type liquid crystal display device.

FIG. 4 schematically shows a basic structure as to each of pixel regions on the array substrate 2.

On right and left sides of a stripe-shaped pixel electrode 21, two stripe-shaped electrodes 22 and 27 are disposed in parallel to each other in such a manner that a distance between the pixel electrode 21 and each of the two counter electrodes 22 and 27 is always kept constant.

The pixel electrode 21 is connected to a signal line 24 through a TFT (thin-film transistor) 26 in which a scanning line 23 serves as a gate electrode. As shown in this drawing, in this TFT 26, an elongated portion 21a elongated from TFT-side end of the pixel electrode 21 serves as a source electrode, while another elongated portion 24a from the signal line serves as a drain electrode.

Farther ends from the TFT, of counter electrodes 22 and 27 are connected to a common wiring line 25 through a storage-capacitance electrode plate 22b on counter-electrode side. Another storage-capacitance electrode plate 21b on pixel-electrode side is elongated from the farther end (from the TFT) of the pixel electrode 21.

TFT-side ends of two counter electrodes 22 and 27 are electrically connected to each other through a coupling 22a. As a result, a fluctuation in potential differences between the counter electrodes 22 and 27 is reduced.

The black matrix 13 shown in FIG. 1 through FIG. 3 shields gaps between either the counter electrode 22 or the elongated portion thereof and either the scanning line 23 or the signal line 24, and also shields the TFT 16. The colored film at each of the above-mentioned pixel regions is covering the pixel display area between the pixel electrode 21 and the counter electrode 22.

As explained above, in accordance with this embodiment, because the projections from the counter substrate 2 serves as the spacers for uniforming the distances between the counter substrate 2 and the array substrate 1, there arise no problems such as uneven distribution and agglomeration of the spherical spacers. Further, because the surface of the substrate having the colored patterns is the flat dye-accepting layer 12, there are few ups and downs and few stepped portions. Because the spacer projections being uniform in projecting dimensions are formed on the flat dye-accepting layer 12, the fluctuation of distances between the substrates is minimized.

Because of drastic reduction of the fluctuation in distance between the substrates, namely thicknesses of the liquid crystal layer, it is possible to drastically suppress the fluctuation of the contrast ratios within image-displaying screen, as well as the occurrence of portions of deteriorated displaying performance.

Further, manufacturing process of the spacer projection 11 only requires normal coating process and normal patterning process, almost no increase of the manufacturing cost is arisen for the liquid crystal display device. Besides, formation of the colored patterns, that is dying of the dye-accepting layer 12, is achievable in a simple and easy method such as the ink jet technique. Consequently, the manufacturing cost for the formation of the colored pattern is reduced, as compared with such a case that colored regions in each of the three primary colors are separately formed by respective coating and patterning process.

Whereas the pillar-shaped spacer projections 11 are formed on the counter substrate 1 in the above-explained embodiment, the pillar-shaped spacer projections may be formed on the array substrate 2 with substantially similar effect. On the other hand, the dye-accepting layer 12 may be provided on the array substrate 2, depending upon a structure of an array substrate.

What is claimed is:

1. A liquid crystal display device comprising:

a first substrate having a color filter layer on a first insulator substrate;

a second substrate opposing to said first substrate;

a spacer projection integrally formed on at least one of said first substrate and said second substrate and keeping a predetermined gap between the substrates;

a liquid crystal layer held in said gap; and a plurality of pixel regions performing a display operation based on the birefringence effect of said liquid crystal layer; wherein:

said color filter layer is obtained by steps of:
coating a curable resin on said first insulator substrate to form a single resin layer; and
tinting the resin layer having a substantially flat open surface, with requested colors, by selectively discharging each dye of the requested colors exclusively on respective preselected regions in the open surface of the resin layer, so that patterns of the dyes are painted on the open surface;

wherein said spacer projections is formed by coating a transparent light-curing resin on said color filter layer thus obtained and by subsequently patterning a layer of the transparent light-curing resin.

2. A liquid crystal display device according to claim 1, wherein:

said resin layer is a layer formed of a dye-accepting material; and said tinting is made in a manner that the each dye has been discharged and accepted by the dye-accepting material in correspondence with respective ones of said pixel regions.

3. A liquid crystal display device according to claim 1 wherein:

said first substrate includes a light shielding film arranged at a peripheral portion of said pixel region; and said spacer projection is provided within a region corresponding to said light shielding film.

4. A liquid crystal display device according to claim 1 wherein:

a pixel electrode and a counter electrode, which are arranged opposite to each other with respect to each of said pixel regions, are included on either said first substrate or said second substrate; and an electric field substantially parallel to a major surface of said second substrate is effected to said liquid crystal layer.

5. A liquid crystal display device according to claim 1 wherein:

liquid crystal molecules which constitute said liquid crystal layer are oriented substantially parallel to main surfaces of said first substrate and said second substrate, and to each other.

6. A liquid crystal display device according to claim 4 wherein:

said pixel electrode with respect to each of said pixel regions is electrically connected to a switching element controlled by corresponding one of scanning lines and corresponding one of signal lines.

7. A liquid crystal display device according to claim 6 wherein:

a black representation is on screen when a potential difference between said pixel electrode and said counter electrode is substantially zero.

8. A liquid crystal display device according to claim 1 wherein said selective discharging of the each dye is made by an ink jet painting technique.

9. A liquid crystal display device according to claim 1 wherein fixing of the dyes and curing of the curable resin are simultaneously made after said selective discharging.

10. A liquid crystal display device according to claim 8 wherein fixing of the dyes and curing of the curable resin are simultaneously made after said selective discharging.

11. A liquid crystal display device according to claim 8 wherein a plurality of dyes are simultaneously applied onto the respective regions to simultaneously paint the patterns of the dyes.

* * * * *